J. DEVEY, J. DEVEY, Jr. & W. A. DEVEY.
BEET TOPPER AND DIGGER.
APPLICATION FILED MAR. 4, 1911.
1,046,448.
Patented Dec. 10, 1912.
2 SHEETS—SHEET 1.
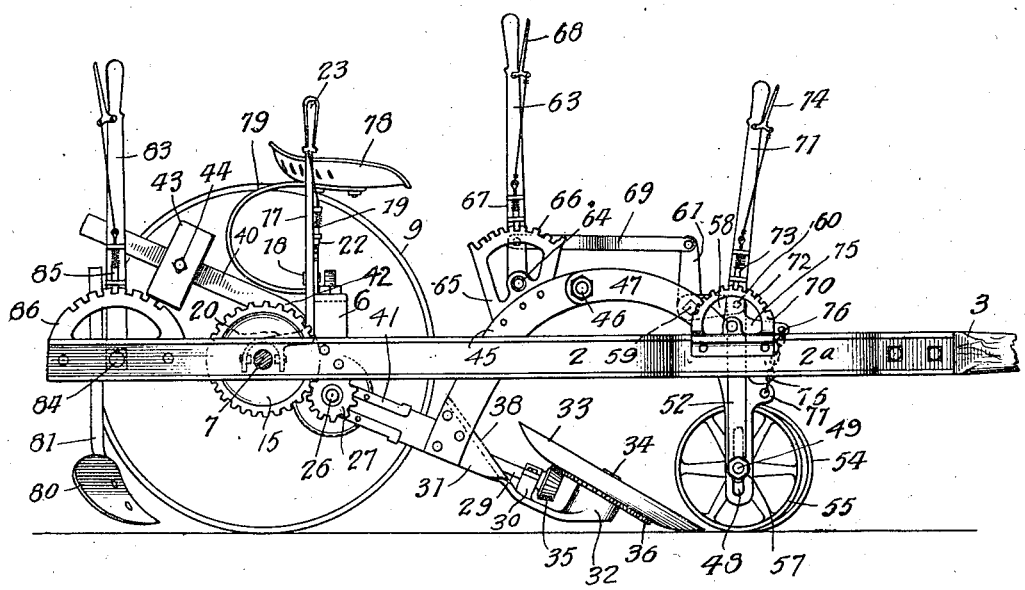
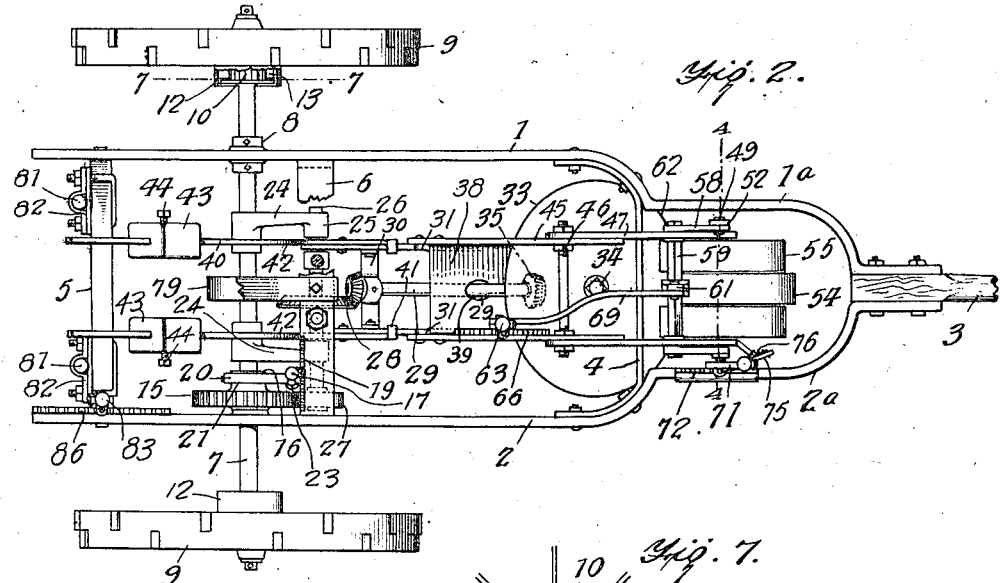
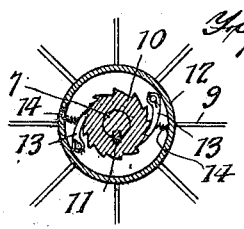
WITNESSES:
INVENTORS
John Devey,
John Devey Jr.
Walter Avery Devey,
BY
ATTORNEYS

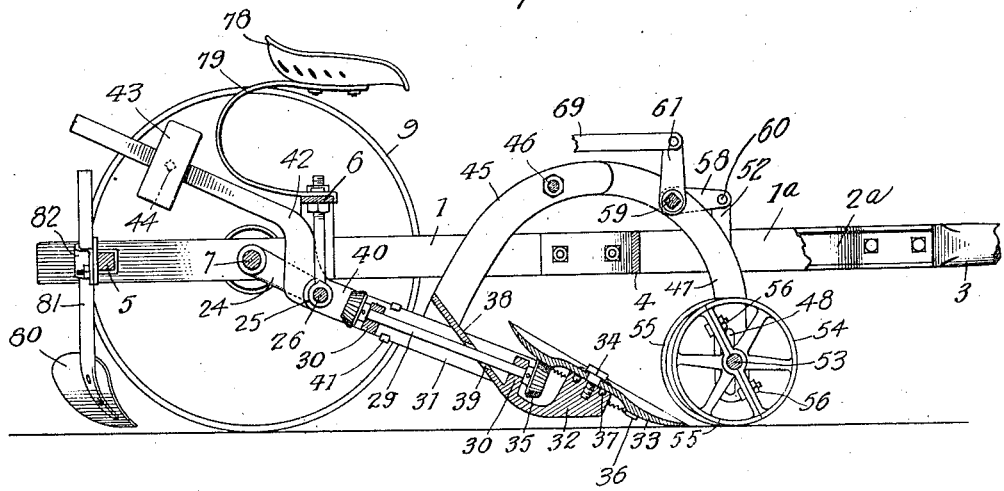
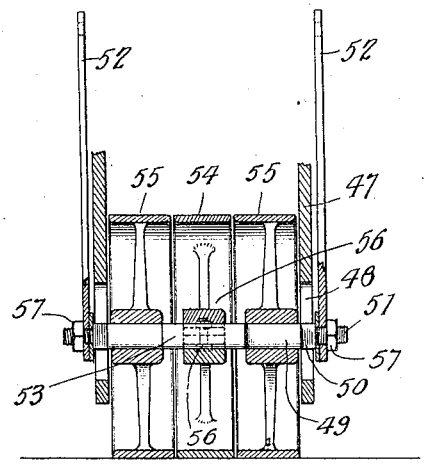
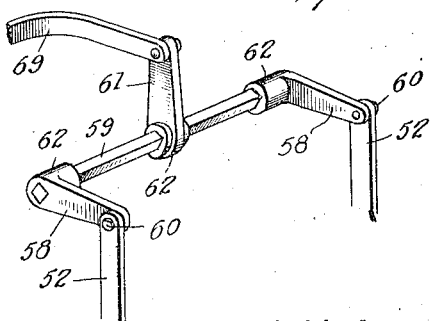
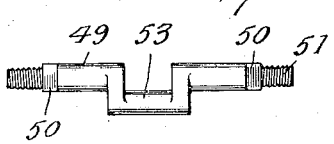

UNITED STATES PATENT OFFICE.

JOHN DEVEY, OF LEHI, JOHN DEVEY, JR., OF GARLAND, AND WALTER AVERY DEVEY, OF AMERICAN FORK, UTAH.

BEET TOPPER AND DIGGER.

1,046,448.     Specification of Letters Patent.     Patented Dec. 10, 1912.

Application filed March 4, 1911. Serial No. 612,179.

*To all whom it may concern:*

Be it known that we, JOHN DEVEY, JOHN DEVEY, Jr., and WALTER AVERY DEVEY, citizens of the United States, and residents of Lehi, county of Utah, Garland, county of Boxelder, and American Fork, county of Utah, in the State of Utah, respectively, have invented certain new and useful Improvements in Beet Toppers and Diggers, of which the following is a specification.

Our invention is an improvement in beet toppers and diggers, and consists in certain novel constructions and combinations of parts, hereinafter described and claimed.

The object of the invention is to provide a simple and easily operated device of the character specified, especially adapted for harvesting sugar beets, which will first top the beets while yet firmly held in the soil, and will afterward dig them.

Referring to the drawings forming a part hereof, Figure 1 is a side view of the improvement. Fig. 2 is a plan view. Fig. 3 is a longitudinal vertical section. Fig. 4 is a section on the line 4—4 of Fig. 2. Fig. 5 is a perspective view of a portion of the adjusting mechanism for the rollers. Fig. 6 is a plan view of the roller axle, and, Fig. 7 is a section on the line 7—7 of Fig. 2.

The present embodiment of the invention is an improvement over our prior Patent No. 975218, dated November 8th, 1910, and comprises a frame composed of substantially parallel side plates 1 and 2. The front end 1ª and 2ª respectively of each of the side plates 1 and 2 is off-set inwardly and is connected to the tongue 3. A brace 4 connects the bars at the rear ends of the offset portions, and cross bars 5 and 6 connect the plates intermediate their rear ends and the brace. An axle 7 is journaled transversely of the frame in bearings 8 on the plates 1 and 2, and wheels 9 are journaled on the ends of the axle, and connected thereto by a pawl and ratchet mechanism, (Fig. 7). A ratchet wheel 10 is keyed to each end of the axle by a key 11, inside the hub 12 of the adjacent wheel, and a plurality of pawls 13 are pivoted to the hub, and are pressed against the ratchet wheel by springs 14.

The arrangement is such that when the wheels are rotating in a forward direction, the axle is carried therewith, while when the wheels are rotating rearwardly, the pawls slip idly over the teeth of the ratchet wheel.

A gear wheel 15 is journaled on the axle and may be connected thereto by a clutch 16. The clutch is operated by a lever 17, pivoted at 18 on a toothed segment 19 rigid with the frame, and having an angular fork 20 at its lower end engaging an annular groove 21 in the movable part of the clutch.

The lever is held in adjusted position by the usual catch 22 slidable on the lever and operated by a latch lever 23. A pair of spaced arms 24 are journaled on the axle, and each arm is provided at its free end with a bearing 25, in which is journaled a counter shaft 26. A pinion 27 on the outer end of the shaft meshes with the gear wheel 15, and a bevel gear 28 is secured to the shaft between the arms.

A shaft 29 is journaled longitudinally of the frame, on cross bars 30, that connect a pair of spaced bars 31, and with the said bars form an auxiliary frame, having at its lower forward end a block 32. The rear end of each bar 31 is journaled on the counter shaft 26 before mentioned. A cutting disk 33 is journaled on the block, by means of a cap screw 34, having a plain portion for receiving the bearing of the disk, and a threaded portion engaging a threaded opening in the block. The adjacent end of the shaft 29 is provided with a bevel gear 35 meshing with a ring 36 of bevel gear teeth on the under face of the disk, and a ball bearing 37 is arranged between the rear face of the disk and the block. A fender plate 38 is arranged behind the cutting disk, in an inclined position, and the said plate has an opening 39 for the shaft 29.

An arm 40 is connected with each of the bars 31 of the auxiliary frame, and each of the arms is lapped at its front end on the adjacent bar, and the edges of the arm are bent over upon the opposite face of the bar, as shown at 41. Each arm is offset upwardly at 42, and extends on the opposite side of the axle from the frame. A weight 43 is slidable on each arm, and is held in adjusted position by a set screw 44. The weights are intended to counterbalance the auxiliary frame, and its attachment, and may be adjusted for the purpose. An arch bar 45 is secured to each of the bars 31 near its front end, and extends upwardly and forwardly, to a connection with a bolt 46, arranged transversely of both arch bars.

The fender plate 38, before mentioned, extends between the arch bars, and the rear end of the plate is flush with the rear edges of the arch bars. A second arch bar 47 is pivoted on the bolt 46, and extends forwardly and downwardly from the said bolt, and the lower end of each bar is longitudinally slotted at 48.

A crank shaft 49, shown more particularly in Fig. 6, is arranged between the bars 47, and each end of the crank shaft is cut away at opposite sides to form a flattened portion 50 for moving in the slot. The extremities of the shaft are threaded at 51, and a link 52 provided with an opening for receiving the threaded portion, is arranged at each end of the shaft, outside of the adjacent arch bar 47. The crank shaft 49 is divided into three bearing portions or journal pins, of equal length, by the crank 53. The crank forms one of the said portions, and since the crank is at the center of the shaft, a similar portion is formed on each side of the said crank. A roller is journaled on each of the said portions, and the shaft is held with the crank extending forwardly, so that the central roller 54 is always in advance of the side rollers 55.

The roller 54 is sectional, as shown in Figs. 3 and 4, and the sections are held on the shaft by bolts 56. Nuts 57 engage the ends of the crank shaft to hold the parts in place, and each of the links 52 is pivotally connected to an arm 58, extending forwardly from a shaft 59, by means of a bolt 60. The shaft 59 is square in cross section, and an arm 61 extends upwardly from the center thereof, and at an angle of 90° with respect to the arms 58. Each of the arms 58 and 61 is provided with a hub 62, having an opening to fit the shaft. A lever 63 is pivoted at 64 on a bracket 65 on one of the side bars of the auxiliary frame, and the bracket is provided with a notched segment 66, engaged by a tooth 67 on the lever to hold the said lever in adjusted position.

The tooth is operated by a grip 68, and the lever is connected to the arm 61 by a link 69. It will be evident that when the lever is swung, the shaft 49 will be raised or lowered, moving in and guided by the slot 48 of the arch bars 47. A bracket 70 is connected with the upper edge of the portion 2ᵃ of the plate 2, and a lever 71 is pivoted to the bracket. The said bracket has a notched segment 72, and a tooth 73 is slidable on the lever and engages the notches of the segment. The tooth is operated by a latch lever 74.

The lever is provided with a lateral arm 75 at its lower end, and a chain 76 connects the said arm with a lateral lug 77 on the adjacent arch bar 47. By moving the lever 71 in the proper direction, the arch bars and the auxiliary frame may be raised or lowered, without changing the position of the crank shaft.

A seat 78 is supported near the axle, by means of a spring plate 79, and a turning plow 80 is arranged behind the axle at each side of the main frame. Each plow is connected with the lower end of a rod 81, slidable in a sectional bearing sleeve 82 on the adjacent end of the cross bars. A lever 83 is pivoted at 84 to the adjacent side bar, and a tooth 85 on the lever coöperates with a notched segment 86 on the frame.

We claim:

1. In a machine of the character specified, a main frame, an axle journaled transversely thereon, wheels on the axle, arms secured to the axle and extending forward therefrom, a shaft journaled in the free ends of the arms, an auxiliary frame pivoted at its rear end on the said shaft, a shaft journaled on the auxiliary frame at right-angles to the first-named shaft, a driving connection between the first-named shaft and the axle, a driving connection between the first-named and last named shafts, a disk cutter journaled at the front end of the auxiliary frame on a substantially vertical axis, said cutter having an annular series of gear teeth on its under face, a bevel gear on the last-named shaft meshing with the gear teeth of the cutter, and means for raising and lowering the front end of the auxiliary frame.

2. In a machine of the class described, comprising a wheel supported main frame, a shaft supported by the main frame, an auxiliary frame pivoted at its rear on the said shaft, a rotary disk cutter journaled at the front of the auxiliary frame on a substantially vertical axis, means for raising and lowering the auxiliary frame, a shaft journaled on the auxiliary frame at right angles to the axis of rotation of the disk, a driving connection between the shaft and the wheels, and a bevel gear wheel on the front end of the shaft, said cutter having an annular series of gear teeth on its under face engaging the bevel gear mentioned.

JOHN DEVEY.
JOHN DEVEY, Jr.
WALTER AVERY DEVEY.

Witnesses:
JOSEPH FRANKLIN DEVEY,
JAMES F. FYFFE.